United States Patent [19]
Shifrin

[11] Patent Number: 4,674,871
[45] Date of Patent: Jun. 23, 1987

[54] SPECTRAL ANALYZER AND DIRECTION INDICATOR

[75] Inventor: Gordon A. Shifrin, Malibu, Calif.

[73] Assignee: Hughes Aircraft Company, Los Angeles, Calif.

[21] Appl. No.: 637,098

[22] Filed: Aug. 2, 1984

[51] Int. Cl.[4] .................. G01B 11/26; G01J 3/28; G01J 3/36
[52] U.S. Cl. ...................... 356/73; 356/141; 356/328
[58] Field of Search ............ 356/73, 141, 328, 335; 250/226

[56] References Cited

U.S. PATENT DOCUMENTS

| | | | |
|---|---|---|---|
| 3,761,184 | 9/1973 | McLaughlin, Jr. | 356/416 |
| 3,929,398 | 12/1975 | Bates | 250/226 X |
| 3,992,099 | 11/1976 | Laughlin | 356/141 X |
| 4,037,959 | 7/1977 | Bumgardner | 356/141 X |

Primary Examiner—Vincent P. McGraw
Attorney, Agent, or Firm—L. B. Sternfels; A. W. Karambelas

[57] ABSTRACT

A spectral analyzer and direction indicator and direction indicator (10,20) is disclosed and includes reflection gratings (13,15,25,27,37,39), associated optical systems (17,19,29,33,41,45) and associated detectors (21,23,31,35,43,47,30). The reflection gratings (13,15,25,27,37,39) are arranged to provided angles of diffraction which are utilized to determine spectral content and incidence direction of collimated or essentially collimated incident radiation.

23 Claims, 7 Drawing Figures

SPECTRAL ANALYZER AND DIRECTION INDICATOR

BACKGROUND OF THE INVENTION

1. Field of the Invention

The disclosed invention generally relates to apparatus for detecting essentially collimated radiation, measuring wavelength values within that radiation, determining the direction to the source of that radiation within an extended field-of-view, and observes the coherence length of sources so as to discriminate between essentially coherent (e.g., laser) and non-coherent radiation, all of which is accomplished simultaneously and in staring fashion (i.e., without scanning).

2. Background Art

The prior art includes a variety of devices for detecting coherent radiation. Examples of such prior art devices are discussed below.

U.S. Pat. No. 3,824,018, issued to Crane, Jr., discloses an unequal path interferometer. The interferometer scans so as to cause a change in the difference in the two optical paths which will modulate the intensity of the recombined coherent radiation by varying interference effects.

U.S. Pat. No. 4,147,424, issued to Foster, et al., discloses a system for detecting the presence of coherent radiation having an interference filter with a pair of partially reflective mirrors, with the spacing between the mirrors being varied sinusoidally to change the transmission wavelength of the mirrors. The output is compared to an established reference signal to produce an identifying indication of the detected radiation.

U.S. Pat. No. 4,170,416 discloses apparatus for detecting the presence of coherent radiation in the presence of incoherent ambient radiation, and for determining the intensity, the wavelength, or the threshold direction of such coherent radiation. The apparatus includes a Fabry Perot etalon having three regions of different thickness.

U.S. Pat. No. 4,183,669, issued to Doyle, and U.S. Pat. No. 4,185,919, issued to Williamson et al., disclose a quadrant detection system using an objective lens and a holographic lens. The holographic lens has lens elements in four quadrants with each quadrant having a focal point corresponding to the position of adjacent photoelectric detectors.

U.S. Pat. No. 3,858,201, issued to Foster, discloses a system for determining a direction from which an illuminating laser beam is received. The system includes a cylindrical optical system for focusing a laser beam as a sharp line image.

U.S. Pat. No. 4,309,108, issued to Siebert, discloses an analyzer for coherent radiation for discriminating wavelength from a single pulse or from a continuous wave radiation and to determine the relative angular position of the source of the radiation. The analyzer includes at least three unequal length path interferometers and detectors for detecting the radiation transmitted through the interferometers.

The foregoing prior art devices are generally complex, relying to a large extent on classical electro-optical techniques and/or the use of scanning.

While the prior art devices exhibit various combinations of features for measuring characteristics of radiation, none, however, has the versatility or all of the particular and extensive features of the disclosed invention combined into a single instrument without the need to scan.

SUMMARY OF THE INVENTION

It is, therefore, an object of this invention is to provide a spectral analyzer and direction indicator that without resorting to scanning detects essentially collimated radiation, and with respect to that radiation, simultaneously measures quantities that uniquely determine (1) its wavelength values within an extended spectral band, (2) its direction within an extended field-of-view, and (3) its coherence length so as to discriminate between radiation that is coherent or essentially coherent and non-coherent. The principle of operation for the disclosed invention applies equally well in any spectral region (e.g., from ultraviolet to microwave) for which there exist suitable dispersive and detecting elements.

It is also an object of the present invention to provide an efficient spectral analyzer and direction indicator responsive to essentially collimated radiation.

Another object of the invention is to provide a rugged and versatile spectral analyzer and direction indicator responsive to essentially collimated radiation.

Still another object of the invention is to provide a spectral analyzer and direction indicator responsive to radiation that is either essentially coherent (e.g., laser) or non-coherent.

A further object of the invention is to provide a non-scanning spectral analyzer and direction indicator that detects essentially collimated radiation, discriminates between radiation that is essentially coherent (e.g. laser) and non-coherent (i.e., spectrally broad), and that locates the direction within a specified but extended field-of-view from which that radiation is received.

An additional object of this invention is to provide a staring spectral analyzer and direction indicator that measures wavelength values contained within the detected radiation, which can be either coherent or non-coherent, and that can occur anywhere within a specified but extended spectral interval.

Still a further object of the invention is to provide a spectral analyzer and direction indicator responsive to collimated or essentially collimated radiation and capable of discriminating a plurality of sources.

A still further object of the invention is to provide a spectral analyzer and direction indicator that is rugged enough to be readily utilized in vehicles.

The foregoing and other objects and purposes of the invention are accomplished in a spectral analyzer and direction indicator system having one or more input apertures each with an extended field-of-view, followed by one or more independent channels, each channel comprising a spectrally dispersive element, an analytical optical system, and a radiation detecting means.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION

In the following detailed description and in the several figures of the drawing, like elements are identified with like reference numerals.

While the disclosed invention is useful with different kinds of essentially collimated radiation (e.g., from ultraviolet to microwave), the disclosed systems will first be described relative to monochromatic (e.g. laser) radiation. This will facilitate the understanding of the principles involved which can then be applied to other sources of radiation.

Figure 1:
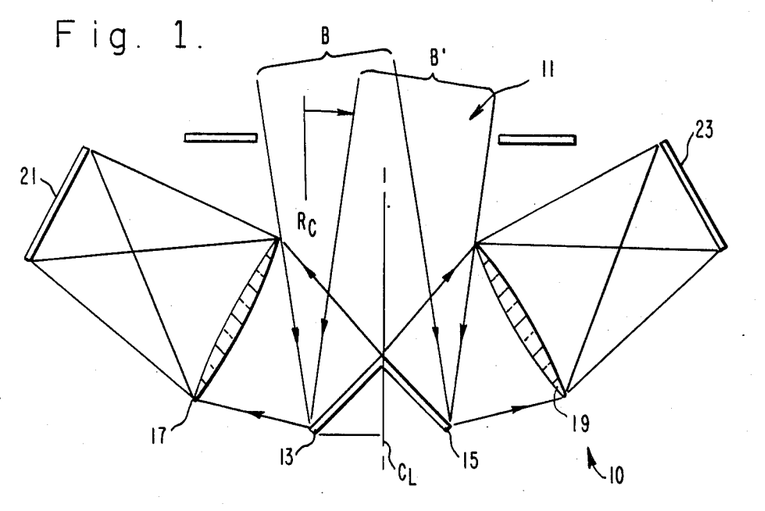
FIG. 1 is an elevation schematic diagram of a one-axis spectral analyzer and direction indicator system made in accordance with the invention.

Referring now to FIG. 1, schematically shown therein is a one-axis spectral analyzer system 10 which includes an aperture 11, a left-side reflection grating 13, and a right-side reflection grating 15. The rulings on the gratings 13 and 15 are normal to the plane of the paper. The gratings are inclined toward each other and meet at their respective edges closest to the aperture 11. The gratings 13 and 15 are symmetrically inclined relative to a centerline $C_L$ which is normal to aperture 11 and passes through the center of the aperture 11. The gratings 13 and 15 are matched as to blaze angle and the number of rulings per millimeter (mm). The lower distal edges of the gratings 13 and 15 and the perimeter of the aperture 11 define a field of view (FOV) which is centered about the FOV centerline $C_L$.

The grating 13 has an associated analytical optical system 17, illustrated schematically as a simple lens; and the grating 15 also has an associated analytical optical system 19 which is illustrated schematically as a simple lens. The respective optical systems 17 and 19 function to collect and focus the diffracted rays from the respective gratings 13 and 15. A linear detector array 21 receives the focused rays from the optical system 17, and a linear detector array 23 receives the focused rays from the optical system 19. Although the operation of this invention is being described here with linear arrays of photo detectors as the detecting means, any other suitable detecting means (such as for example photographic plates or optical reticles) would be consistent with the general concept of the invention.

Although reflection gratings are disclosed in this description, other dispersive elements, such as transmissive gratings and refractive prisms, can be utilized with appropriate optical systems and detector systems.

FIG. 1 shows a beam B and another beam B' which illustrate the limits of the angular position relative to the centerline $C_L$ of an incoming beam which would be detected by the spectral analyzer and direction indicator system 10.

As will be readily apparent, the one-axis system 10 provides angular information in association with diffractive action of the grating in the plane of the drawing (i.e., in the direction perpendicular to the rulings of the grating). Angular information in association with reflective action of the grating (i.e., in the direction parallel to the rulings) also is available. Such angular displacements (reflective action) can be incorporated into the overall FOV of the system without actual measurement by suitable lengthening of the elements in the detector array without segmentation. These angular displacements can be measured, however, by introducing suitable segmentation of elements in the detector array.

The analytical optical systems 17 and 19 must be able to collect and focus rays diffracted over the entire angular subtense emanating from reflection gratings 13 and 15. Both the extended FOV (i.e., the subtense of allowable input beam angles) and the extended spectral interval (i.e., the range of allowable spectral values from sources) contribute to the possible range of angular subtense from the grating. The incidence of essentially monochromatic (e.g., from a laser) radiation will produce on each detector array 21 and 23 a focused area that is a relatively small spot. As discussed below, the positions of the focused spots on the detectors 21 and 23 depend on wavelength and the direction (angle) of the incoming laser beam.

The inclined and opposed orientation of the reflection gratings 13 and 15 shown in FIG. 1 result in diffraction patterns (and thus detector arrays) that are widely separated spatially relative to each other. In another embodiment of the spectral analyzer and direction indicator, input apertures are widely separated in a suitable fashion, and (after focusing by the analytical optical system) the diffraction patterns are generated in close proximity to each other. This latter arrangement is particularly useful for cooled detector arrays, because the arrays then can share a common dewar.

The spectral analyzer and direction indicator system 10 in essence include two electro-optical channels wherein each channel is separate and independent, and each generates its own information. One channel includes the left side reflection grating 13, the optical system 17, and the detector array 21; and the other channel includes the right side reflection grating 15, the optical system 19, and the detector array 23. For the following discussion which will include multiple axis spectral analyzer systems, a channel will be considered as including a reflection grating or other dispersive element, an associated optical system, and an appropriate detector.

Figure 2:
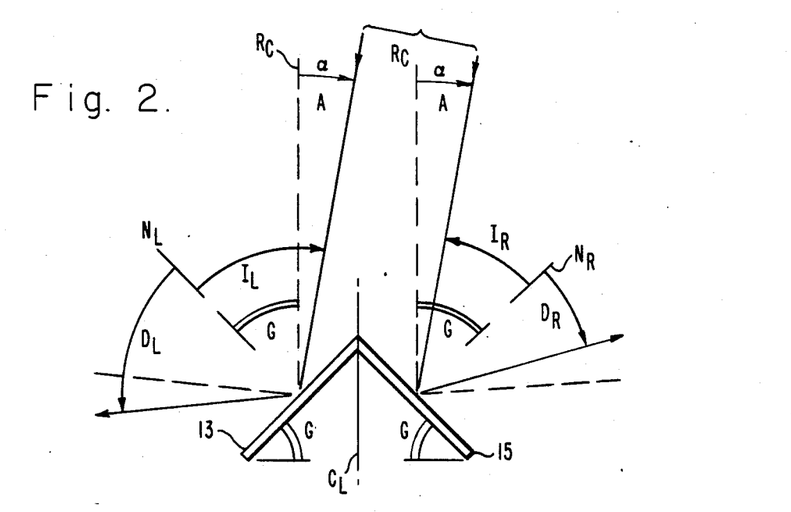
FIG. 2 is a schematic elevation diagram illustrating the parameters and sign conventions used in describing the disclosed detection systems.

For ease of discussion, the parameters and sign conventions for the spectral analyzer system 10 are shown in FIG. 2. The beam angle A is the angle of an incident beam relative to the centerline $C_L$, and is shown relative to a reference line $R_C$ which is parallel to the centerline $C_L$. The beam angle A is positive in the clockwise direction.

Relative to a line perpendicular to the centerline $C_L$, the left side reflection grating 13 and the right side reflection grating 15 are each inclined at an angle G. For symmetry and convenient analysis, the reflection gratings 13 and 15 are each inclined at the same angle G. By way of example, the angle G may be 45 degrees and would be set as required by the particular optical design.

Associated with the left side reflection grating 13 is a line $N_L$ which is normal to the surface of the grating 13. The angle of incidence of $I_L$ of the incoming beam as to the left side reflection grating 13 is measured relative to the normal $N_L$. The angle $I_L$ is positive in the clockwise direction. The angle of diffraction $D_L$ as to the left side reflection grating 13 is measured relative to the normal $N_L$. The angle $D_L$ is positive in the counter clockwise direction.

Associated with the right side reflection grating 15 is a line $N_R$ which is normal to the surface of the grating 15. The angle of incidence $I_R$ of the incoming beam as to the right side reflection grating 15 is measured relative to the normal $N_L$. The angle of incidence $I_R$ is positive in the counter clockwise direction. The angle diffraction $D_R$ as to the right side reflection grating 15 is measured relative to the normal $N_R$. The angle $D_R$ is positive in the clockwise direction.

In FIG. 2, the convention is such that angles of rays (measured with respect to the normal) on opposite sides of a normal to a reflection grating have opposite algebraic signs.

With equal grating inclination angles G, the angles of incidence $I_L$ and $I_R$ are related as follows:

$$I_L = G + A \qquad \text{(Eq. 1)}$$

$$I_R = G - A \qquad \text{(Eq. 2)}$$

$$I_L + I_R = 2G \qquad \text{(Eq. 3)}$$

Thus, for a given incident beam within the FOV, the sum of the angles of incidence on the reflector gratings 13 and 15 is always equal to twice the inclination angle G.

Figure 3:
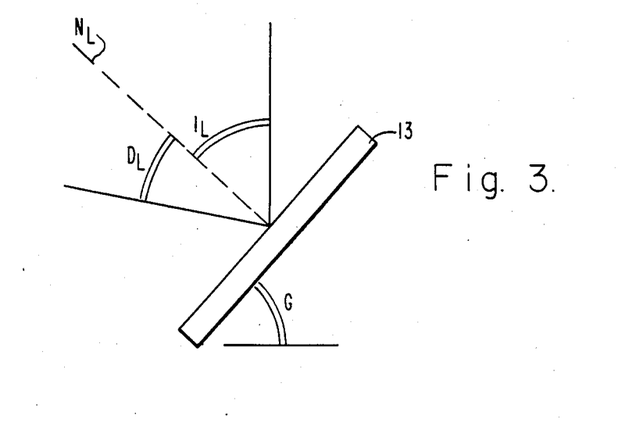
FIG. 3 is an illustration of the optical performance of one of the reflection gratings shown in the system of FIG. 1.

Referring now to FIG. 3, shown therein is the left side reflection grating 13 which will be utilized to illustrate the following applicable grating equation:

$$\sin D_L = (nW)/d - \sin I_L \qquad \text{(Eq. 4)}$$

The symbols represent the following:

TABLE I $I_L$: angle of incidence, left side
$D_L$: angle of diffraction, left side
W: wavelength
n: order of diffraction
d: spacing of adjacent rulings on grating Relative to the right side reflection grating 15, a similar grating equation is applicable:

$$\sin D_R = (nW)/d - \sin I_R \qquad \text{(Eq. 5)}$$

The symbols represent the following:

TABLE II $I_R$: angle of incidence, right side
$D_R$: angle of diffraction, right side
W: wavelength
n: order of diffraction
d: spacing of adjacent rulings on grating
An expression for coherence length L is:

$$L = W^2/(\pi \Delta W) \qquad \text{(Eq. 6)}$$

where $\Delta W$ is the spectral band width in the radiation. Since the spectral analyzer and direction indicator can yield values for both wavelength and spectral bandwidth, coherence length can be obtained from measured quantities to within an upper limit set by the spectral resolution of any particular instrument.

In the disclosed system 10, the reflection gratings 13 and 15 are substantially matched as to blaze angle and number of rulings per mm. By way of example, each of the reflection gratings 13 and 15 is ruled at 600 lines per mm. The reflection gratings 13 and 15 are blazed so that first order diffraction dominates.

From Equations 4 and 5, it follows that the angle of diffraction depends on both angle of incidence and wavelength of the incident radiation. A single grating 13 as shown in FIG. 3 cannot be utilized for separate determination of angle of incidence and wavelength since those two parameters are inextricably mixed. For example, the angle of diffraction of an incoming beam having a wavelength of 1064 nanometers (nm) entering at a beam angle of 10 degrees is the same as that for an incoming beam having a wavelength of 694 nm entering at a beam angle of $-2.77$ degrees.

In operation, the location of the images on the linear detector arrays 21 and 23 will depend on the nature of the light radiation within the FOV of the detector system 10. When the incident light is collimated, the diffracted light will also be collimated. For a laser source, a focused spot is produced on each of the detector arrays 21 and 23. The location of each focused spot on the detector array provides a measure of the angle of diffraction which, as discussed above, is a function of both beam angle and wavelength.

For a point source that is spectrally broad, the image on each detector array will not be a single focused spot but will be an image that occupies an angular interval along each array whose extent is determined by the spectral content of the source. Each illuminated detector element corresponds to both an angle of diffraction and a small angular interval in angle of diffraction from the grating and its signal level represents the amplitude of a portion of the spectrum. Thus, both the spectral signature of the point source and its angular position within the FOV can be determined when the information contained in these illuminated detector elements is suitably interpreted.

The respective values for beam angle (A) and wavelength (W) can be determined from the left and right angles of diffraction ($D_L$, $D_R$) as follows:

$$A = \arcsin \frac{\sin D_R - \sin D_L}{2 \cos G} \qquad \text{(Eq. 7)}$$

$$W = \frac{d}{2n} (\sin D_L + \sin D_R + 2 \sin G \cos A) \qquad \text{(Eq. 8)}$$

From the foregoing Equation 7, the beam angle A is determined and its value is substituted in Equation 8 to yield the wavelength W.

Figure 4:
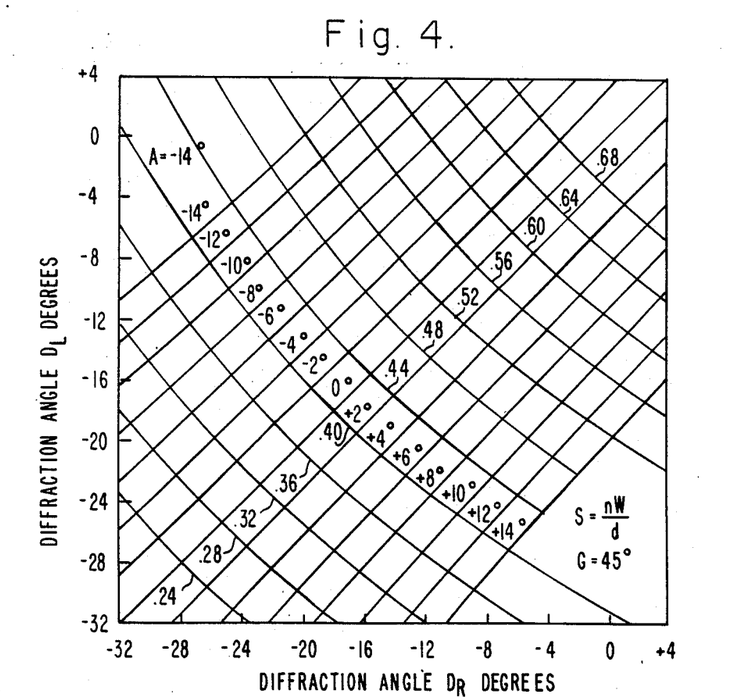
FIG. 4 is a plot showing the relationship between two angles of diffraction observed independently and simultaneously and the corresponding values of wavelength and direction.

FIG. 4 shows the general relationship between the two observed angles of diffraction ($D_L$ and $D_R$) and the corresponding values of wavelength (W) and beam angle (A) for a single-axis spectral analyzer and direction indicator. The curves for this figure were obtained using Equations 7 and 8 given above. The coordinates of the figure are the two angles of diffraction observed at the detector arrays. The plot itself consists of two families of curves. One family contains curves of constant beam angle; the other family contains curves of constant beam angle. Any combination of two angles of diffraction establishes a location on the plot. This same location uniquely defines the corresponding values of wavelength and direction. Thus, a single monochromatic source occupies one spot on the plot. Several simultaneous monochromatic sources located in various parts of the field-of-view would occupy appropriate locations on the plot, but they would be clearly separated. If these monochromatic sources are of the same wavelength, then they would be distributed along one such curve. An angularly small source that is spectrally broad would be spread out along one line of constant direction (beam angle) but would intersect a range of curves of constant wavelength. This spread in wavelength corresponds to the spectral bandwidth of the source. Thus, FIG. 4 illustrates many performance features of the spectral analyzer and direction indicator.

Since each of the elements of the detector arrays 21 and 23 provides an indication of the respective angles of diffraction, then with appropriate calibration and processing circuitry, the images on the detector arrays 21 and 23 are utilized to provide appropriate angular values. Such angular values are then utilized to calculate beam angle (A) and wavelength (W) in accordance with Equations 7 and 8.

In systems with less stringent resolution requirements which can tolerate look-up tables to determine wavelength and directions, Equations 7 and 8 can be utilized to generate the values for such look-up tables. Alternatively, the look-up tables can be generated empirically.

In the spectral analyzer system 10, the elements of the detector arrays 21 and 23 are elongated elements which are arranged parallel to the rulings on the reflection gratings 13 and 15. That is, the length dimension of the elements extends normally to the plane of the 3 FIG. 1 drawing.

Figure 5:
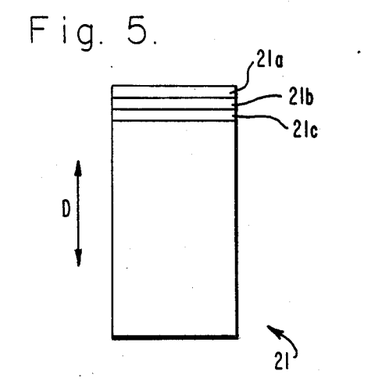
FIG. 5 is a schematic diagram of a linear detector array utilized in the disclosed spectral analyzer systems.

FIG. 5 schematically shows the incident side of the detector array 21 and includes representative detector elements 21a, 21b and 21c. The directions of change of angle of diffraction is indicated by the double arrow D, and each detector element is representative of an associated angle of diffraction. Each detector element is elongated to allow for detection of a source angularly displaced as to an axis orthogonal to the axis of the one-axis detector system 10 and parallel to the rulings on its associated reflection gratings. For greater angular resolution with respect to diffraction, narrower detector elements (i.e., more detector elements per unit angle of diffraction) would be provided.

It will be appreciated that design parameters such as angular subtense of the detector arrays 21 and 23, and the angular density of the elements of such detector arrays are readily determined on the basis of the particular contemplated application of the spectral analyzer system 10. For example, for detection of collimated or nearly collimated light radiation with broad spectral content, the optical systems 17 and 19, and the detector arrays 21 and 23 must accommodate the appropriate angular subtense for the system FOV. That angular subtense will depend on both the FOV and the range of radiation wavelengths of interest.

Some general observations may be made as the response of the detector system 10 to changes in wavelength and direction. Referring to FIG. 2, for given beam angle A, the angles of diffraction $D_L$ and $D_R$ increase positively with decreasing wavelength W. For a given wavelength W, a change in beam angle A changes the angles of diffraction $D_L$ and $D_R$ in opposite senses; but both change in the same clockwise or counter clockwise direction.

The development of the disclosed invention has also provided other observations as to that relation between angles of diffraction ($D_L$, $D_R$), beam angle (A), and wavelength (W). For a given wavelength, it has been observed that the sum of the angles of diffraction $D_L$ and $D_R$ is approximately constant. Thus, the sum of the angles of diffraction can provide a rough approximation of wavelength. The difference of the angles of diffraction (e.g., $D_R - D_L$) can provide a crude measure of beam angle (A) since that difference is roughly independent of wavelength.

Figure 6:
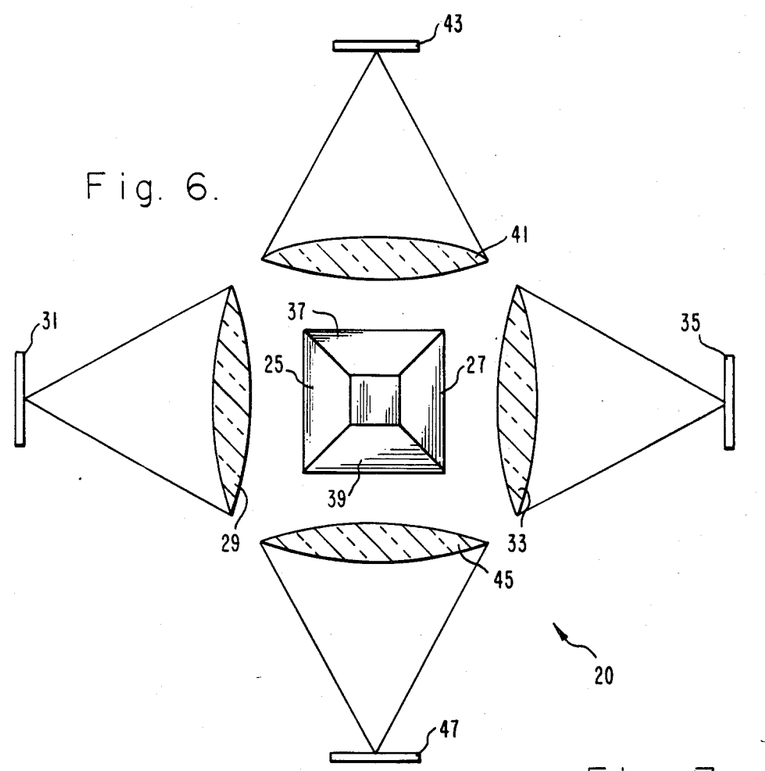
FIG. 6 is a top plan schematic diagram of a two-axis spectral analyzer system made in accordance with the invention.

Referring now to FIG. 6, shown therein is a schematic top plan view of a two-axis spectral analyzer system 20 which is in essence two one-axis spectral analyzer systems at right angles to each other. The detector system 20 includes a left-side reflection grating 25 and a right-side reflection grating 27 which are inclined toward each other so that their distal edges are the deepest edges of the gratings and are parallel. The rulings on each grating are parallel to the distal edges, and to each other, as indicated by the line segments in FIG. 6.

The left-side reflection grating 25 has an associated optical system 29 which is shown schematically as a simple lens. The optical system 29 images upon a linear detector array 31. The right-side grating 27 has an associated optical system 33 which images upon a linear detector array 35.

The spectral analyzer system 20 further includes an upper reflection grating 37 and a lower reflection grating 39 which are inclined toward each other so that their distal edges are the deepest edges of the two gratings and are parallel.

The upper reflection grating 37 has an associated optical system 41, which is shown schematically as a simple lens. The optical system 41 images upon a linear detector array 43. The lower reflection grating 39 has an associated optical system 45 which images upon a linear detector array 45.

The reflection gratings 25,27,37,39 form a truncated pyramid and are all matched as to the number of lines per mm, and as to blaze angle. By way of example, the gratings are blazed so that first order diffraction dominates.

The detector arrays are shown in edge view for convenience. The actual angular positions of detector arrays will depend upon different factors, including the characteristics of the optical systems and the inclination angle of the reflection gratings. Each of the linear detector arrays includes a plurality of elongated elements arranged in a plane and parallel to the respective edges shown. That is, all elements in a particular detector array are parallel to the rulings on its associated reflection grating, as discussed above relative to the one-axis spectral analyzer system 10 of FIG. 1.

As has been described for the one-axis system 10, the two-axis system 20 also could employ several widely separated optical apertures such that the detector arrays then could be closely spaced. This arrangement would facilitate a common cooling system for detectors, should one be necessary.

The two axis spectral analyzer system 20 includes four channels, each channel having a reflection grating, an associated optical system, and a detector array. Each channel and its associated linear detector array would have the appropriate angular subtense for a system field of view which would be similar to the FOV of the one-axis detector system 10 of FIG. 1. The two-axis detector system 20 would also have a field of view centerline. The system FOV would depend upon several factors including the input aperture (not shown) and the dimensions of the reflection gratings.

By way of example, the left (25,29,31) and right (27,33,35) channels may be regarded as providing azimuth information; and the upper (37,41,43) and lower (39,45,47) channels would then be regarded as providing elevation information. Thus, the left detector array 31 and the right detector array 35 would detect azimuth information; and the upper detector array 43 and the lower detector array 47 would detect elevation information.

For each pair of opposing channels for one axis, Equations 7 and 8 can be solved to yield wavelength and beam angle along such axis. Thus, wavelength would be determined redundantly.

Since the spectral analyzer system 20 determines wavelength redundantly, one of the channels can be removed. In such a system, the three channels can be arranged so that they include a one-axis spectral analyzer system 10 as shown in FIG. 1, and another channel at right angles to the one-axis system. The one-axis system would be used to determine wavelength as well as angular information along one axis, while the remaining channel would provide angular information along the orthogonal axis.

Another configuration for a two-axis system uses three channels in which two channels are equivalent to a single axis system with gratings as the dispersing elements. The third channel arranged at right angles, which is used only to determine direction along the orthogonal axis, does not need a dispersing element. Thus, this third channel requires only a mirror rather than a grating.

A three-channel system could also have its individual channels arranged symmetrically with a uniform spacing of 120 degrees. Such a three-channel system, however, would require relatively complex computations to determine wavelength and the two orthogonal angular coordinates of beam angle in terms of the three observed angles of diffraction. Look-up tables in terms of the three observed angles of diffraction would be appropriate for systems requiring relatively coarse resolution.

Figure 7:
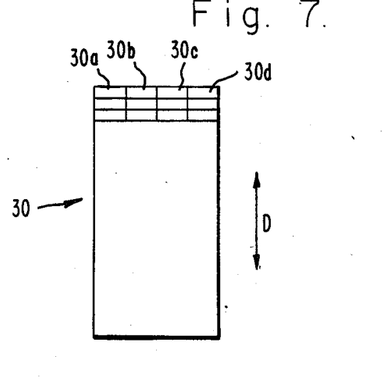
FIG. 7 is a schematic diagram of a segmented detector array which may be utilized in the detector systems schematically shown in FIGS. 1 and 3.

In the foregoing systems, each detector array is linear (i.e., capable of sensing along a single dimension) and has elongated elements. Such elongated elements result in a degraded Noise Equivalent Irradiance (NEI) since additional background radiation is collected by the larger area of each elongated detector element. In those applications where low NEI is required or preferred, two-dimensional detector arrays can be utilized. In such detector arrays, several shorter detector elements are utilized in place of an elongated detector element. FIG. 7 schematically shows a two-dimensional detector array 30 which is oriented similarly to the linear detector array 21 shown in FIG. 5. The array 30 includes a plurality of short segment detectors representatively shown as 30a, 30b, 30c and so forth.

When a two-dimensional detector array 30 is utilized, the locations of the images in the direction D are of interest and provide angular information. Although location in the direction perpendicular to D may provide some information, the resolution is coarse because of the relatively large lengths of the individual detector elements.

It should be noted, however, that when two-dimensional detector arrays are utilized, the number of detector channels is increased resulting in added cost and complexity.

In the foregoing described spectral analyzer and direction indicator systems 10 and 20, the gratings themselves function as the first active optical surface. In some configurations, suitable optical systems can be employed to collect additional radiation and to direct this radiation as a collimated beam upon each reflection grating. For example, a telescopic lens system might be included for additional light collection.

While the foregoing discussion has generally been in relation to a single nonchromatic laser source, the disclosed spectral analyzer systems are capable of providing information for identifying and interpreting more complicated sources. Such identification and interpretation would require appropriate capabilities of the detector arrays including sensitivity, dynamic range of response and speed of response. Data processing equipment would analyze the information detected as to characteristics such as location, amplitude, rise time and duration to interpret radiation sources as to type and/or direction.

Sources of optical radiation may include, in addition to monochromatic lasers, solar glints, chopped non-laser sources, lasers that radiate many lines, multiple reflections from a single source, and spatially narrow spectrally broad bright sources. Complicated sources of optical radiation might include a plurality of sources of optical radiation. Discriminating and interpreting the optical information provided by different sources would be based on the known responses of the detector system to different sources.

Although the foregoing has been a description and illustration of specific embodiments of the invention, various modifications and changes thereto can be made by persons skilled in the art without departing from the scope and spirit of the invention as defined by the following claims.

What is claimed is:

1. A spectral analyzer and direction indicator system for receiving collimated or essentially collimated incident radiation comprising:

first optical means responsive to the collimated or essentially collimated incident radiation for providing first optical diffraction information;

second optical means responsive to the collimated or essentially collimated incident radiation for providing second optical diffraction information;

detector means illuminated by said first and second optical information for providing, as a function of the locations on said detector means illuminated by said first and second optical information, detected information indicative of the spectral content and incidence direction of the collimated or essentially collimated incident radiation.

2. The spectral analyzer and direction indicator system of claim 1 wherein each of said first and second optical means includes a spectrally dispersing element.

3. The spectral analyzer and direction indicator system of claim 2 wherein said spectrally dispersing elements include reflection gratings.

4. The spectral analyzer and direction indicator system of claim 1 wherein said detector means includes a first detector array responsive to said first optical information, and a second detector array responsive to said second optical information.

5. A spectral analyzer and direction indicator system for receiving collimated or essentially collimated incident radiation comprising:
  first spectrally dispersing and focusing optical means responsive to the collimated or essentially collimated incident radiation for providing first axis optical diffraction information;
  second spectrally dispersing and focusing optical means responsive to the collimated or essentially collimated incident radiation for providing second axis optical diffraction information; and
  detector means illuminated by said first axis and second axis optical diffraction information for providing, in response to the locations on said detector means illuminated by said first axis optical information, detected information indicative of the spectral content of the collimated or essentially collimated incident radiation and incidence direction as to a first coordinate axis, and for providing, in response to the locations on said detector means illuminated by said second axis optical information, detected information indicative of incidence direction as to a second coordinate axis.

6. The spectral analyzer and direction indicator system of claim 5 wherein said first optical means comprises:
  a first spectrally dispersive element;
  first focusing means for focusing the radiation provided by said first spectrally dispersive element;
  a second spectrally dispersive element; and
  second focusing means for focusing the radiation provided by said second spectrally dispersive element to said detector means.

7. The spectral analyzer and direction indicator system of claim 6 wherein said second optical means comprises:
  a third spectrally dispersive element; and
  third focusing means for focusing the radiation provided by said third spectrally dispersive element to said detector means.

8. The spectral analyzer and direction indicator system of claim 7 wherein each of said first, second and third spectrally dispersive elements comprises a reflection grating.

9. The spectral analyzer and direction indicator system of claim 7 wherein said detector means includes a respective detector array for each of said first, second and third spectrally dispersive elements.

10. A spectral analyzer and direction indicator system for receiving collimated or essentially collimated incident radiation comprising:
  a first optical channel having a first diffraction grating; and
  a second optical channel having a second diffraction grating relative to said first diffraction grating such that the angles of diffraction resulting from diffraction by said first and second diffraction gratings are in combination indicative of wavelength and incidence direction of the collimated or essentially collimated incident radiation.

11. The spectral analyzer and direction indicator system of claim 10 wherein said first optical channel includes a first detector array, and wherein said second optical channel includes a second detector array.

12. The spectral analyzer and direction indicator system of claim 11 wherein said first and second diffraction gratings form an included angle of about ninety degrees.

13. A spectral analyzer and direction indicator system for receiving collimated or essentially collimated incident radiation comprising:
  optical means responsive to the collimated or essentially collimated incident radiation for providing optical diffraction information representative of the spectral content and incidence direction of the collimated or essentially collimated incident radiation; and
  detector means illuminated by said optical information for providing, as a function of the locations on said detector means illuminated by said optical diffraction information, detected information indicative of the spectral content and incidence direction of the collimated or essentially collimated incident radiation, and further indicative of the coherence length of the collimated or essentially collimated incident radiation.

14. The spectral analyzer and direction indicator system of claim 14 wherein said optical means includes at least two spectrally dispersive elements.

15. The spectral analyzer and direction indicator system of claim 14 wherein each said spectrally dispersive element is a reflection grating.

16. The spectral analyzer and direction indicator system of claim 15 wherein said detector means includes detector arrays.

17. A spectral analyzer and direction indicator system for receiving collimated or essentially collimated incident radiation comprising:
  first optical means responsive to the collimated or essentially collimated incident radiation for providing first optical diffraction information;
  first analytical optical means for focusing the radiation containing said first optical information;
  second optical means responsive to the collimated or essentially collimated incident radiation for providing second optical diffraction information;
  second analytical optical means for focusing the radiation containing said second optical information; and
  detection means illuminated by the radiation containing said first and second optical information for providing, as a function of the locations on said detection means illuminated by said radiation, detected information indicative of the spectral content, the incidence direction, and the coherence length of the collimated or essentially collimated incident radiation.

18. The spectral analyzer and direction indicator system of claim 17 wherein said first optical means comprises a first reflection grating, and wherein said second optical means comprises a second reflection grating.

19. The spectral analyzer and direction indicator system of claim 18 wherein said detection means comprises:
  a first detector array responsive to said first optical information; and
  a second detector array responsive to said second optical information.

20. A spectral analyzer and direction indicator system for receiving collimated or essentially collimated incident radiation comprising:
  at least two nominally identical independent optical channels arranged with uniform angular separation between their respective axes;

each of the said channels having optical means responsive to the collimated or essentially collimated incident radiation for providing optical diffraction information, an analytical optical means for focusing the radiation containing the optical information, and a detection means responsive to said radiation containing the optical information for providing detected information as a function of the locations of said detection means illuminated by the radiation;

said detected information from all channels in combination yielding information indicative of the spectral content, the incidence direction, and the coherence length of the collimated or essentially collimated incident radiation.

21. The spectral analyzer and direction indicator system of claim 20 wherein said optical means comprises a spectrally dispersive element.

22. The spectral analyzer and direction indicator system of claim 21 wherein said spectrally dispersive element comprises a reflection grating.

23. The spectral analyzer and direction indicator system of claim 20 wherein said detection means comprises a detector array.

* * * * *